United States Patent
Urquhart

(10) Patent No.: US 7,344,297 B2
(45) Date of Patent: Mar. 18, 2008

(54) METHOD AND APPARATUS FOR ASYNCHRONOUS BLENDING AND SUPPLY OF CHEMICAL SOLUTIONS

(75) Inventor: Karl J. Urquhart, Mc Kinney, TX (US)

(73) Assignee: Air Liquide Electronics U.S. LP, Houston, TX (US)

( * ) Notice: Subject to any disclaimer, the term of this patent is extended or adjusted under 35 U.S.C. 154(b) by 465 days.

(21) Appl. No.: 11/107,494

(22) Filed: Apr. 15, 2005

(65) Prior Publication Data

US 2005/0286340 A1 Dec. 29, 2005

Related U.S. Application Data

(60) Continuation-in-part of application No. 10/939,570, filed on Sep. 13, 2004, which is a division of application No. 09/468,411, filed on Dec. 20, 1999, now Pat. No. 6,799,883, which is a continuation-in-part of application No. 09/051,304, filed on Apr. 16, 1998, now Pat. No. 6,050,283.

(51) Int. Cl.
*B01F 15/02* (2006.01)

(52) U.S. Cl. ............... 366/132; 366/134; 366/136; 366/152.1; 366/152.3; 366/152.4; 366/141; 137/4; 137/5; 137/92; 137/93

(58) Field of Classification Search ............ 366/132, 366/134, 136, 137, 152.1–152.4, 141, 142, 366/159.1; 137/3–5, 88, 91–93
See application file for complete search history.

(56) References Cited

U.S. PATENT DOCUMENTS

| | | | | |
|---|---|---|---|---|
| 2,979,066 A | * | 4/1961 | Christie | 137/3 |
| 4,403,866 A | * | 9/1983 | Falcoff et al. | 366/132 |
| 6,120,175 A | * | 9/2000 | Tewell | 366/140 |
| 6,224,778 B1 | * | 5/2001 | Peltzer | 210/739 |
| 6,623,183 B2 | * | 9/2003 | Nakagawa et al. | 396/578 |
| 2002/0048213 A1 | * | 4/2002 | Wilmer et al. | 366/136 |
| 2002/0136087 A1 | * | 9/2002 | Nakagawa et al. | 366/152.4 |
| 2002/0144727 A1 | | 10/2002 | Kashkoush et al. | |
| 2004/0052154 A1 | * | 3/2004 | Hiraoka et al. | 366/136 |
| 2004/0125688 A1 | * | 7/2004 | Kelley et al. | 366/152.2 |
| 2004/0144164 A1 | | 7/2004 | Bergman | |

FOREIGN PATENT DOCUMENTS

| | | | |
|---|---|---|---|
| FR | 2833365 A | | 6/2003 |
| WO | 9953121 A | | 10/1999 |

OTHER PUBLICATIONS

PCT International Search Report, Aug. 23, 2006.

* cited by examiner

*Primary Examiner*—David Sorkin
(74) *Attorney, Agent, or Firm*—Brandon Clark

(57) ABSTRACT

The invention is a method and apparatus for asynchronous blending and supply of chemical solutions. The method of the present invention includes a continuous blending system. This continuous blending system monitors the output and continuously adjusts the blending system to achieve a predetermined formulation of at least a first solution. A centralized monitoring system continuously evaluates the solutions and adjusts the output of the blender as needed to maintain the predetermined formulation of the solution. The system includes at least a first tank system. Any solutions that are delivered from this tank system are also continuously monitored, evaluated, and adjusted as needed by the centralized monitoring system.

46 Claims, 6 Drawing Sheets

METHOD AND APPARATUS FOR ASYNCHRONOUS BLENDING AND SUPPLY OF CHEMICAL SOLUTIONS

CROSS REFERENCE TO RELATED APPLICATIONS

This is a continuation-in-part of application Ser. No. 10/939,570, filed Sep. 13, 2004, which is a divisional of application Ser. No. 09/468,411, filed Dec. 20, 1999, now U.S. Pat. No. 6,799,883, which is a continuation-in-part of application Ser. No. 09/051,304, filed Apr. 16, 1998, now U.S. Pat. No. 6,050,283.

BACKGROUND

The combining of two or more fluids (liquids or gases) together to form a defined mixture is fundamental to many industrial processes and commercial products. Typically, this combining is performed in discrete batches. In such a batch process, a quantity of the first fluid is added, followed by a quantity of the second fluid. These two fluids are mechanically mixed, and the resulting mixture is sampled. If necessary, additional quantities of either the first or second fluid can be further added to refine the composition of the mixture. Once the desired composition is achieved, the batch is transferred to an intermediate or end user.

This type of batching or blending process is common to many industrial segments including semiconductor processing, pharmaceutical products, biomedical products, food processing products, household products, personal care products, petroleum products, chemical products, and many other general industrial liquid products.

Batch processing, or batching, entails many drawbacks and limitations. For example, usually large tanks are required, and since this process can be time consuming, large volume batches are typically prepared at the same time. This large scale requires substantial manufacturing space, and large batch volumes dictate a relatively fixed, and inflexible manufacturing schedule. Large volumes are typically batched in order to overcome the relative imprecision of constituent fluid measurement. Large volumes help to reduce these errors as a percentage of the total batch quantity. Another drawback of batching is that the batch frequently changes its rheological or chemical properties over time. This aging effect is common to many formulations and over time it forces many adjustments to be made prior to sending the composition to the intermediate or end user. Batching can also lead to open, or partially open tanks and to fluids exposed to the atmosphere. This can lead to unwanted chemical contamination, chemical degradation and to microbial contamination.

Batching can also lead to difficulties in mixing together the fluid components in large volumes. It is often true that the components can be mixed only with difficulty and require prolonged agitation to become homogeneous. It is also well known that it is common for different levels of a large tank to have different proportionate mixtures of the fluids. It is also true that the large volumes typically committed to batching cause cleaning to be slow, laborious, and difficult to automate. Large volumes of cleaning effluents are produced, leading to issues of waste and contamination.

Because of these numerous and substantial shortcomings, and limitations, alternative means of fluid products manufacturing have been sought. One alternative method to batch processing is known as continuous blending.

Continuous blending embodies the notion of combining constituent fluids to form a fluid product only as needed or on a demand basis. Essentially, the product is made on demand and at the rate required. The rate required is typically based on the demand of the fluid filling machine packaging the liquid product.

The appeal of a continuous blending system, as distinct from a batch processing system, is clear. The ability to eliminate the large batch preparation and holding tanks leads to a small system volume, more product compounding flexibility, faster product formulation turn around, and a substantially lower capital cost. Continuous blending can also yield superior product formula accuracy, and quality, and can eliminate the barrier between fluid products processing, and fluid products packaging. Continuous blending can greatly reduce waste, cleanup time, and effluent volumes. Furthermore, the mixing is simplified and results in far more homogeneous formulations. The product aging effects are also largely eliminated. The real issue is how to build and operate a continuous blending system, with the maximum degree of accuracy, flexibility of use, and versatility of application in a broad range of commercial sectors.

Numerous designs for continuous stream blending have been proposed, originating from various liquids processing industries, particularly beverage processing and food processing. These designs have been attempts to develop and market continuous flow proportioning, or blending systems based upon ratio flow control using flow meters, and proportional-integral-derivative (PID) feedback control loops.

This is a type of feedback controller whose output, a control variable, is generally based on the error between some user-defined set point, and some measured process variable. Each element of the PID controller refers to a particular action taken on the error.

Proportional: error multiplied by a gain, $K_p$. This is an adjustable amplifier. In many systems, $K_p$ is responsible for process stability; too low and the PV can drift away; too high and the PV can oscillate.

Integral: the integral of error multiplied by a gain, $K_i$. In many systems, $K_i$ is responsible for driving error to zero, but, to set $K_i$ too high, is to invite oscillation or instability or integrator windup or actuator saturation.

Derivative: the rate of change of error multiplied by a gain, $K_d$. In many systems, $K_d$ is responsible for system response; too high and the PV will oscillate; too low and the PV will respond sluggishly. The designer should also note that derivative action amplifies any noise in the error signal.

An example of this type of continuous mixer would be the "Contimix", which was introduced by H & K Inc., of New Berlin, Wis. In general, these designs rely on regulating a continuous flow of the liquid streams using variable orifice valves or speed controlled pumps, where the flow rate signal from a flow meter, most often a Coriolis mass flow meter, is used to proportionately modulate the flow control device in order to attempt to maintain a desired ratio of flows among the streams, and where another signal representing overall system demand rate is used to proportionately modulate the summed flow of the entire system.

Several major design problems are encountered with continuous blending systems, utilizing this flow architecture. First, as the overall output of the system is increased or decreased, the rate of change capability, or response time constant of each stream, will vary one from the next. Thus, with a varying output command signal, each stream reacts at a different rate causing loss of ratio flow, and this is further aggravated by the overshoot or undershoot of each stream as a new set point is reached. Also, as each stream flow rate changes, it can perturb the flow rate of the other stream, or streams causing hunting or oscillations. These common control problems can cause serious loss of blended stream accuracy. Clearly, PID loop controllers are designed to control complex systems that are not inherently designed for stability or ease of control. They deal with the interacting, multiple dependent and independent variables of a flow stream in a non-real time, statistical way and "fight" changing parameters on an historical basis.

Still, another problem can arise when a feedback signal change causes the flow to briefly go below or above the permissible range of the flow meter generating, the feedback signal. Even with software or hardware safeties, this can occur, and as will be discussed fully further on, the requirement to maintain flow through a Coriolis mass flow meter within a defined range to achieve satisfactory accuracy is clearly demonstrable.

Perhaps, the major problem encountered with these designs, and the PID control architecture arises with the inevitable need to start and stop the flow stream system. When a stop-start event occurs, it is very difficult to bring the system back on-line with balanced, and accurate flow, and blending. This problem has been so persistent, that nearly all installed systems have resorted to the use of a surge tank, of up to several hundred gallons capacity to allow blending flow to continue during brief filler machine stoppages.

Even with the use of a surge tank, if blending flow must stop, because of a prolonged filler stoppage, upon re-start the flow streams must either be diverted until correct flow rates are reestablished, or the surge tank must be quite large to allow poorly matched flow ratios to be statistically "diluted" to prevent loss of accurate blending. Either method results in substantial waste, decreased blending accuracy, increased system complexity, and increased system volume, thus depleting the sought after advantages of continuous blending.

Therefore, there is a need in the industry for a blending system that addresses all these issues. A blending system is needed that can accommodate continuous changes in demand, while maintaining a highly precise blend accuracy. There is also a need for a blending system that integrates into an overall chemical supply and inventory scheme. A need exists for a blending system that can produce multiple blended solutions and, supply them to multiple end-users, at a high production rate, and with high resolution. A need exists for a blending system that can correct blended product that may have been temporarily stored in vessels, prior to delivery to the end-user. A need exists within the industry for a blending system that has the ability to track and confirm the chemical compositions of the initial components, intermediate blends, and final solution blends.

SUMMARY

The present invention provides a chemical blending system. The system includes:

Mixing continuously at least a first chemical stream with a second chemical stream in a blender system. This blender system, comprising a mixing zone in a conduit system, and in a real time controlled manner, form a first solution. In this system, the first chemical stream, and the second chemical stream are continuously introduced into the mixing zone.

Monitoring continuously the first solution, wherein this monitoring results in a first solution output signal that is sent to a centralized monitoring system.

Adjusting continuously the flow rate of the first chemical stream and the flow rate of the second chemical stream to maintain the predetermined formulation of the first solution.

Introduction of the first solution into a first tank system, wherein the first tank system is connected to a chemical distribution system. The first tank system further comprises at least a first tank and a second tank.

Delivering a second solution having a predetermined formulation from the first tank system to the chemical distribution system.

Monitoring continuously the second solution, wherein this monitoring results in a second solution output signal that is sent to the centralized monitoring system.

Delivering the first solution to the first tank system, and adjusting continuously the flow rate of the first chemical stream, and the flow rate of the second chemical stream in order to maintain the predetermined formulation of the second solution.

These and other features, aspects, and advantages of the present invention will become better understood with reference to the following description and appended claims.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

As disclosed in application Ser. No. 09/468,411, filed Dec. 20, 1999, herein incorporated by reference, a continuous blender has been developed that addresses the shortcomings of the prior art, as well as others known and unknown to those in the industry.

As used with respect to instruments and process monitoring equipment of this invention, the term "continuous", refers to an uninterrupted, real time monitoring, and adjustment of the formulation of the solutions, including digital controls and algorithms. The use of the term "continuous" is not intended to imply that this system or apparatus must only use analog, or continuous, signals and may not use discrete, or digital, signals to perform this monitoring and adjustment.

As used with respect to processes and process equipment of this invention, the term "continuous" is used to describe a process that substantially simultaneously feeds and removes product without interruption of the process and to distinguish this system, and apparatus from a batch system, or apparatus. The use of the term "continuous" is not intended to imply that this system or apparatus will run, or is required to run, endlessly without any interruption.

As used herein, the term "centralized monitoring" or "centralized monitoring system," refers to any system known to one of skill in the art that allows the centralized monitoring of remote sensors, and control of remote process actuators (stitches, valves, flow controllers, etc.). This centralized monitoring system can be located somewhat locally, or can be located at a remote station that is accessed through a server or other data transfer system known to one skilled in the art. This centralized monitoring system may have the capability of being interfaced by field operators, via laptops or other hand held devices, to perform diagnostics or repair operations. Some examples of such centralized monitoring systems are a Distributed Control System (DCS), or a Supervisory Control and Data Acquisition (SCADA) network.

The basic principle is to blend a product in a continuous process cycle, while maintaining accuracy and quality in a controlled manner. This is accomplished by varying the supply of the components at injection points using a concentration monitor signature as the main control of each component injection rate. This process blends the production a continuous process cycle by adding components in individual calibrated stages, then controlling these stages with the concentration monitors instrumentation sets.

Figure 1:
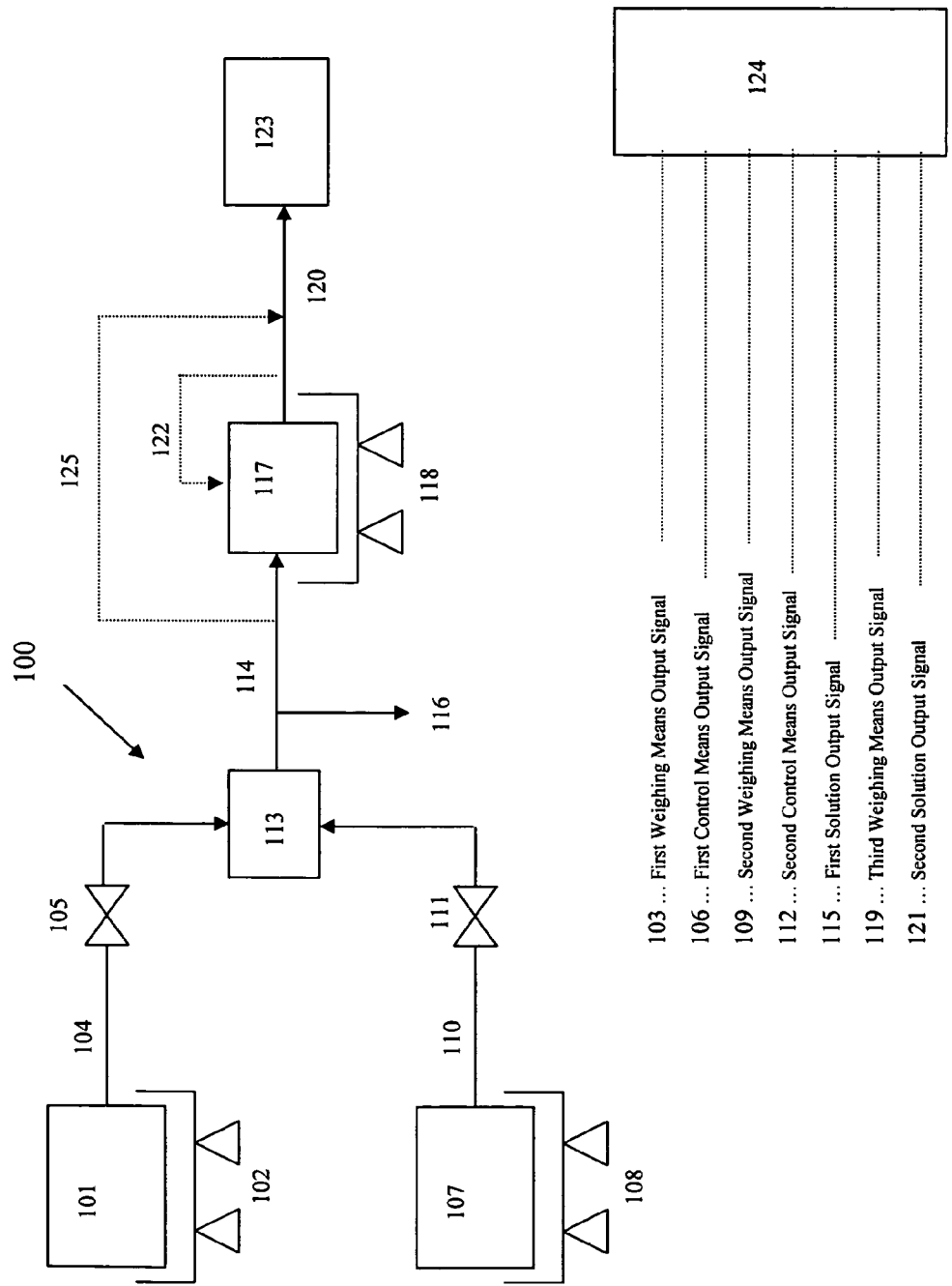
FIG. 1 is a stylized diagram of an illustrative embodiment of a blending system in accordance with the present invention.

FIG. 1, is a stylized diagram depicting an illustrative embodiment of a blending system 100 according to the present invention. The blending system 100 comprises a first chemical stream 104, a second chemical stream 110, a blender system 113, a first tank system 117, and a chemical distribution system 123.

The first chemical stream 104 passes through a first flow control means 105, which generates a first control means output signal 106, which is monitored by the centralized monitoring system 124. The second chemical stream 110 passes through a second control means 111, which generates a second control means output signal 112, which is monitored by the centralized monitoring system 124. The first chemical stream 104 and the second chemical stream 110 are then mixed in the blender system 113, wherein a first solution 114 is formed. A first solution output signal 115 is generated, which is monitored by the centralized monitoring system 124. Based on the nature of first solution output signal 115, the centralized monitoring system 124 will direct either the first flow control means 105 and/or the second flow control means 111 to adjust the flow rate of the first chemical stream 104 and/or the flow rate of the second chemical stream 110, in order to achieve a predetermined formulation for first solution 114. Until the centralized monitoring system 124 receives a first solution output signal 115 that indicates that the predetermined formulation for the first solution 114 is within specification, the output stream from blender system 113 is directed to drain 116.

Once the first solution 114 is within specification, is no longer directed toward drain 116, but is directed instead to a first tank system 117. As required, a second solution 120 is removed from the first tank system 117 and directed toward the chemical distribution system 123. As this second solution 120 is removed from the first tank system 117, a second solution output signal 121 is monitored by the centralized monitoring system 124. Based on the nature of second solution output signal 121, the centralized monitoring system 124 will direct either the first flow control means 105 and/or the second flow control means 111 to adjust the flow rate of the first chemical stream 104 and/or the flow rate of the second chemical stream 110, which will be directed to the first tank system 117, in order to achieve a predetermined formulation for second solution 120. Until the centralized monitoring system 124 receives a second solution output signal 121 that indicates that the predetermined formulation for the second solution 120 is within specification, the output stream from the first tank system 117 is recycled 122 back to first tank system 117. Once the second solution 120 is within specification, it is no longer recycled 122, but is directed instead to chemical distribution system 123. Alternately, first solution 114 may bypass 125 the first tank system 117 and be directed toward chemical distribution system 123.

The blender system 113 comprises a mixing zone in a conduit system. The first chemical stream 104 and the second chemical stream 110 are continuously mixed in this mixing zone and controlled in a real time manner as discussed above, thereby forming a first solution 114 with a predetermined formulation.

Should there arise a situation where more than one adjustment is required from the blender system 113 simultaneously, for example the chemical distribution system 123 may receive a signal that the second solution 120 is not at the predetermined formulation at the same that it receives a signal that the first solution 114 is not at the predetermined formulation, then the adjustment to the second solution 120 may have a higher priority than the adjustment to the first solution 114. One embodiment is that the closer that the maladjustment in solution formulation is to entering the chemical distribution system 123, the higher the priority that that adjustment has.

The first chemical stream 104 may be obtained from a first component tank 101. This first component tank 101 may have a first weighing means 102, which may generate a first weighing means output signal 103, which is monitored by the centralized monitoring system 124. The second chemical stream 110 may be obtained from a second component tank 107. This second component tank 107 may have a second weighing means 108, which may generate a second weighing means output signal 109, which is monitored by the centralized monitoring system 124.

The first tank system 117 comprises at least two tanks, a first tank and a second tank, which are operated either in parallel or in series. These tanks may have a third weighing means 118, which may generate a third weighing means output signal 119, which is monitored by the centralized monitoring system 124. These first and second tanks may have a recirculation system, which may be used to maintain a homogeneous blend within the tanks. Should a deviation arise in the second solution 120 from the predetermined formulation, the time that it will take to adjust the flowrates of either the first chemical stream 104 or the second chemical stream 110 in order to return the solution to the predetermined formulation may be less than about 15 minutes. These first and second tanks may be sized for at least 3 days of constant use by the chemical distribution system.

The drain cycle discussed above regarding drain 116 may be designed to take less than 8 seconds, before achieving the target predetermined formulation. The drain cycle discussed above regarding drain 116 may be designed so that less than 1 gallon is directed to the drain before achieving the target predetermined formulation.

The blender system 113 may be designed to have a design flow rate of less than about 80 liters per minute. The blender system 113 may be designed to have a design flow rate of less than 1,000,000 gallons per month. The blender system 113 may be designed to have a design flow rate of less than 1,500,000 gallons per month.

The predetermined formulation of either first solution 114 and/or second solution 120 may be maintained by the blender system 113 to within an accuracy of greater than about 0.003 wt %. The predetermined formulation of either first solution 114 and/or second solution 120 may be maintained by the blender system 113 to within an accuracy of greater than about 0.01 wt %.

The first and/or second solution may be monitored for at least one concentration criteria selected from the following group:
a) conductivity;
b) sound velocity;
c) density;
d) viscosity;
e) refractive index;
f) turbidity;
g) auto titration; and
h) a manual analytical verification.

The first and/or second flow control means 105, 111 may control and/or monitor both flow rate and pressure. The first and/or second flow control means 105, 111 may monitor temperature. The combined flow rate, pressure and temperature measurements made by the first and/or second flow control means 105, 111 may be used to index for temperature during concentration calculations for either the first and/or second solutions 114, 120.

The flow rate output signals from the first flow control means 105, the second flow control means 111, and the first solution output signal 115, may be used in conjunction with the first weighing means output signal 103 in order to verify the initial concentration of the contents of the first component tank 101. The flow rate output signals from the first flow control means 105, the second flow control means 111, and the first solution output signal 115, may be used in conjunction with the second weighing means output signal 109 in order to verify the initial concentration of the contents of the second component tank 107.

The change in the first weighing means output signal 103 as a function in time and the change in the second weighing means output signal 109 as a function of time, may be used to verify the flow rate of the first solution 114.

The change in the first weighing means output signal 103 as a function in time, the change in the second weighing means output signal 109 as a function of time, and the change in the third weighing means output signal 115 as a function of time may be used to verify the flow rate of the second solution 120.

Figure 2:
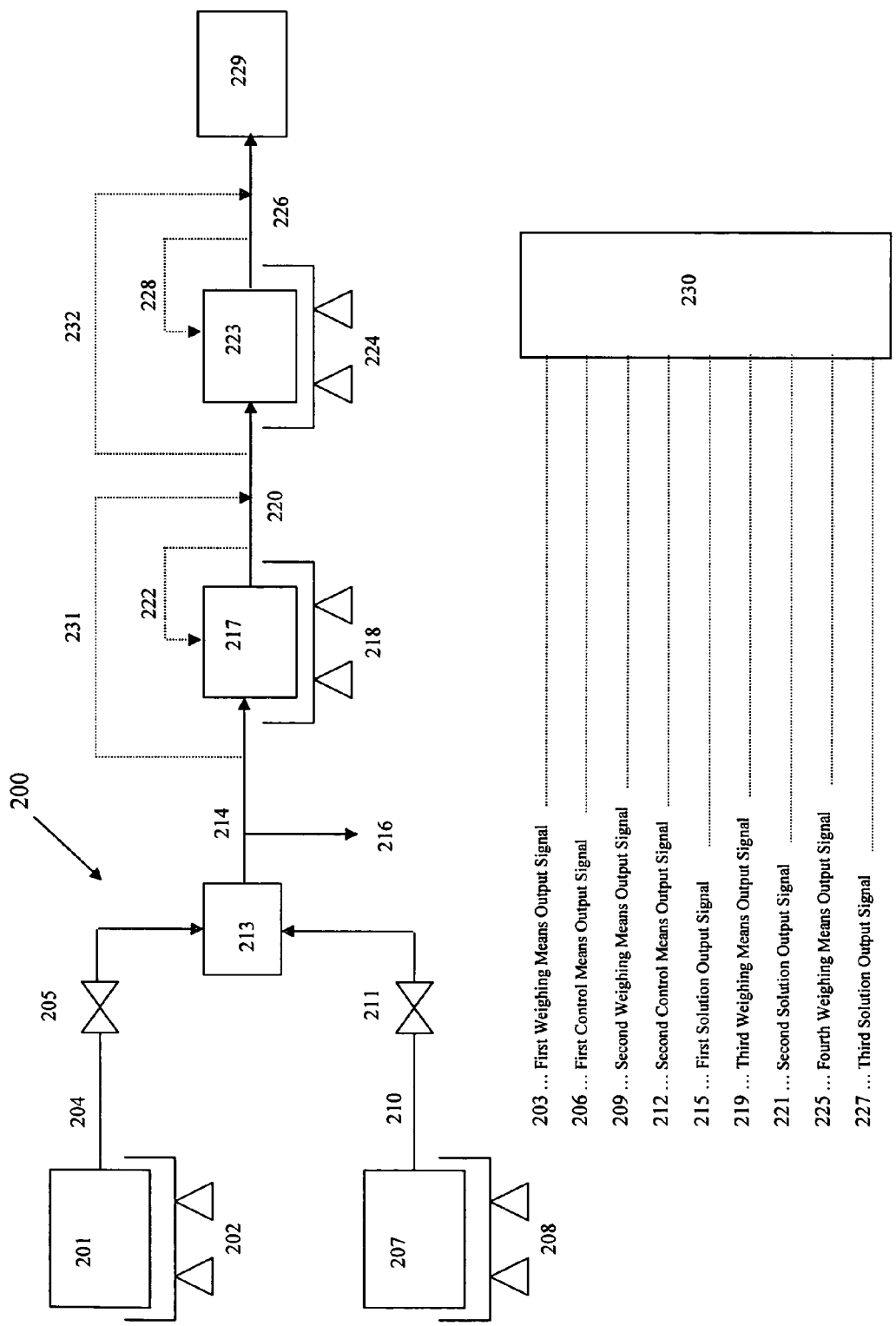
FIG. 2 is a stylized diagram of another illustrative embodiment of a blending system in accordance with the present invention.

FIG. 2 is a stylized diagram depicting another illustrative embodiment of a blending system 200 according to the present invention. The blending system 200 comprises a first chemical stream 204, a second chemical stream 210, a blender system 213, a first tank system 217, a second tank system 223, and a chemical distribution system 229.

The first chemical stream 204 passes through a first flow control means 205, which generates a first control means output signal 206, which is monitored by the centralized monitoring system 230. The second chemical stream 210 passes through a second control means 211, which generates a second control means output signal 212, which is monitored by the centralized monitoring system 230. The first chemical stream 204 and the second chemical stream 210 are then mixed in the blender system 213, wherein a first solution 214 is formed. A first solution output signal 215 is generated, which is monitored by the centralized monitoring system 230. Based on the nature of first solution output signal 215, the centralized monitoring system 230 will direct either the first flow control means 205 and/or the second flow control means 211 to adjust the flow rate of the first chemical stream 204 and/or the flow rate of the second chemical stream 210, in order to achieve a predetermined formulation for first solution 214. Until the centralized monitoring system 230 receives a first solution output signal 215 that indicates that the predetermined formulation for the first solution 214 is within specification, the output stream from blender system 213 is directed to drain 216.

Once the first solution 214 is within specification, it is no longer directed toward drain 216, but is directed instead to a first tank system 217. As required, a second solution 220 is removed from the first tank system 217 and directed toward the second tank system 223. As this second solution 220 is removed from the first tank system 217, a second solution output signal 221 is monitored by the centralized monitoring system 230.

Based on the nature of second solution output signal 221, the centralized monitoring system 230 will direct either the first flow control means 205 and/or the second flow control means 211 to adjust the flow rate of the first chemical stream 204 and/or the flow rate of the second chemical stream 210, which will be directed to the first tank system 217, in order to achieve a predetermined formulation for second solution 220. Until the centralized monitoring system 230 receives a second solution output signal 221 that indicates that the predetermined formulation for the second solution 220 is within specification, the output stream from the first tank system 217 is recycled 222 back to the first tank system 217.

Once the second solution 220 is within specification, it is no longer recycled 222, but is directed instead to second tank system 223. Alternately, first solution 214 may bypass 231 the first tank system 217 and be directed toward second tank system 223. As required, a third solution 226 is removed from the second tank system 223 and directed toward the chemical distribution system 229. As this third solution 226 is removed from the second tank system 223, a third solution output signal 227 is monitored by the centralized monitoring system 230. Based on the nature of third solution output signal 227, the centralized monitoring system 230 will direct either the first flow control means 205 and/or the second flow control means 211 to adjust the flow rate of the first chemical stream 204 and/or the flow rate of the second chemical stream 210, which will be directed to the second tank system 223, in order to achieve a predetermined formulation for third solution 226. Until the centralized monitoring system 230 receives a third solution output signal 227 that indicates that the predetermined formulation for the third solution 226 is within specification, the output stream from the second tank system 223 is recycled 228 back to the second tank system 223. Once the third solution 226 is within specification, it is no longer recycled 228, but is directed instead to chemical distribution system 229. Alternately, second solution 220 may bypass 232 the second tank system 223 and be directed toward chemical distribution system 229.

The blender system 213 comprises a mixing zone in a conduit system. The first chemical stream 204 and the second chemical stream 210 are continuously mixed in this mixing zone and controlled in a real time manner as discussed above, thereby forming a first solution 214 with a predetermined formulation.

Should there arise a situation where more than one adjustment is required from the blender system 213 simultaneously, for example the chemical distribution system 229 may receive a signal that the third solution 226 is not at the predetermined formulation at the same time that it receives both a signal that the second solution 220 is not at the predetermined formulation and a signal that the first solution 214 is not at the predetermined formulation, then the adjustment to the third solution 226 may have a higher priority than the adjustment of the second solution 220, which may in turn have a higher priority than the adjustment to the first solution 214. One embodiment is that the closer that the maladjustment in solution formulation is to entering the chemical distribution system 229, the higher the priority that that adjustment has.

The first chemical stream 204 may be obtained from a first component tank 201. This first component tank 201 may have a first weighing means 202, which may generate a first weighing means output signal 203, which is monitored by the centralized monitoring system 230. The second chemical stream 210 may be obtained from a second component tank 207. This second component tank 207 may have a second weighing means, which may generate a second weighing means output signal 209, which is monitored by the centralized monitoring system 230.

The first and/or second tank system 217, 223 comprises at least two tanks each, which are operated either in parallel or in series. These tanks may have a third weighing means 218 and/or a fourth weighing means 224, which may generate a third weighing means output signal 219 and/or a fourth weighing means output signal 225, which is monitored by the centralized monitoring system 230. These tanks may have a recirculation system, which may be used to maintain a homogeneous blend within the tanks. Should a deviation arise in either the second solution 220 and/or the third solution 226 from the predetermined formulations, the time that it will take to adjust the flow rates of either the first chemical stream 204 or the second chemical stream 210 in order to return either of the solutions to the predetermined formulation may be less than about 15 minutes. These tanks may be sized for at least 3 days of constant use by the chemical distribution system.

The drain cycle discussed above regarding drain 216 may be designed to take less than 8 seconds, before achieving the target predetermined formulation. The drain cycle discussed above regarding drain 216 may be designed so that less than 1 gallon is directed to the drain before achieving the target predetermined formulation.

The blender system 213 may be designed to have a design flow rate of less than about 80 liters per minute. The blender system 213 may be designed to have a design flow rate of less than 1,000,000 gallons per month. The blender system 213 may be designed to have a design flow rate of less than 1,500,000 gallons per month.

The predetermined formulation of either first solution 214 and/or second solution 220 and/or third solution 226 may be maintained by the blender system 213 to within an accuracy of greater than about 0.003 wt %. The predetermined formulation of either first solution 214 and/or second solution 220 and/or the third solution 226 may be maintained by the blender system 213 to within an accuracy of greater than about 0.01 wt %.

The first and/or second solution and/or third solution may be monitored for at least one concentration criteria selected from the following group:
a) conductivity;
b) sound velocity;
c) density;
d) viscosity;
e) refractive index;
f) turbidity;
g) auto titration; and
h) a manual analytical verification.

The first and/or second flow control means 205, 211 may control and/or monitor both flow rate and pressure. The first and/or second flow control means 205, 211 may monitor temperature. The combined flow rate, pressure and temperature measurements made by the first and/or second flow control means 205, 211 may be used to index for temperature during concentration calculations for either the first and/or second solutions 214, 220.

The flow rate output signals from the first flow control means 205, the second flow control means 211, and the first solution output signal 215, may be used in conjunction with the first weighing means output signal 203 in order to verify the initial concentration of the contents of the first component tank 201. The flow rate output signals from the first flow control means 205, the second flow control means 211, and the first solution output signal 215, may be used in conjunction with the second weighing means output signal 209 in order to verify the initial concentration of the contents of the second component tank 207.

The change in the first weighing means output signal 203 as a function in time and the change in the second weighing means output signal 209 as a function of time, may be used to verify the flow rate of the first solution 214.

The change in the first weighing means output signal 203 as a function in time, the change in the second weighing means output signal 209 as a function of time, and the change in the third weighing means output signal 219 as a function of time may be used to verify the flow rate of the second solution 220.

The change in the first weighing means output signal 203 as a function in time, the change in the second weighing means output signal 209 as a function of time, the change in the third weighing means output signal 219 as a function of time, and the change in the fourth weighing means output signal 225 as a function of time may be used to verify the flow rate of the third solution 226.

Figure 3:
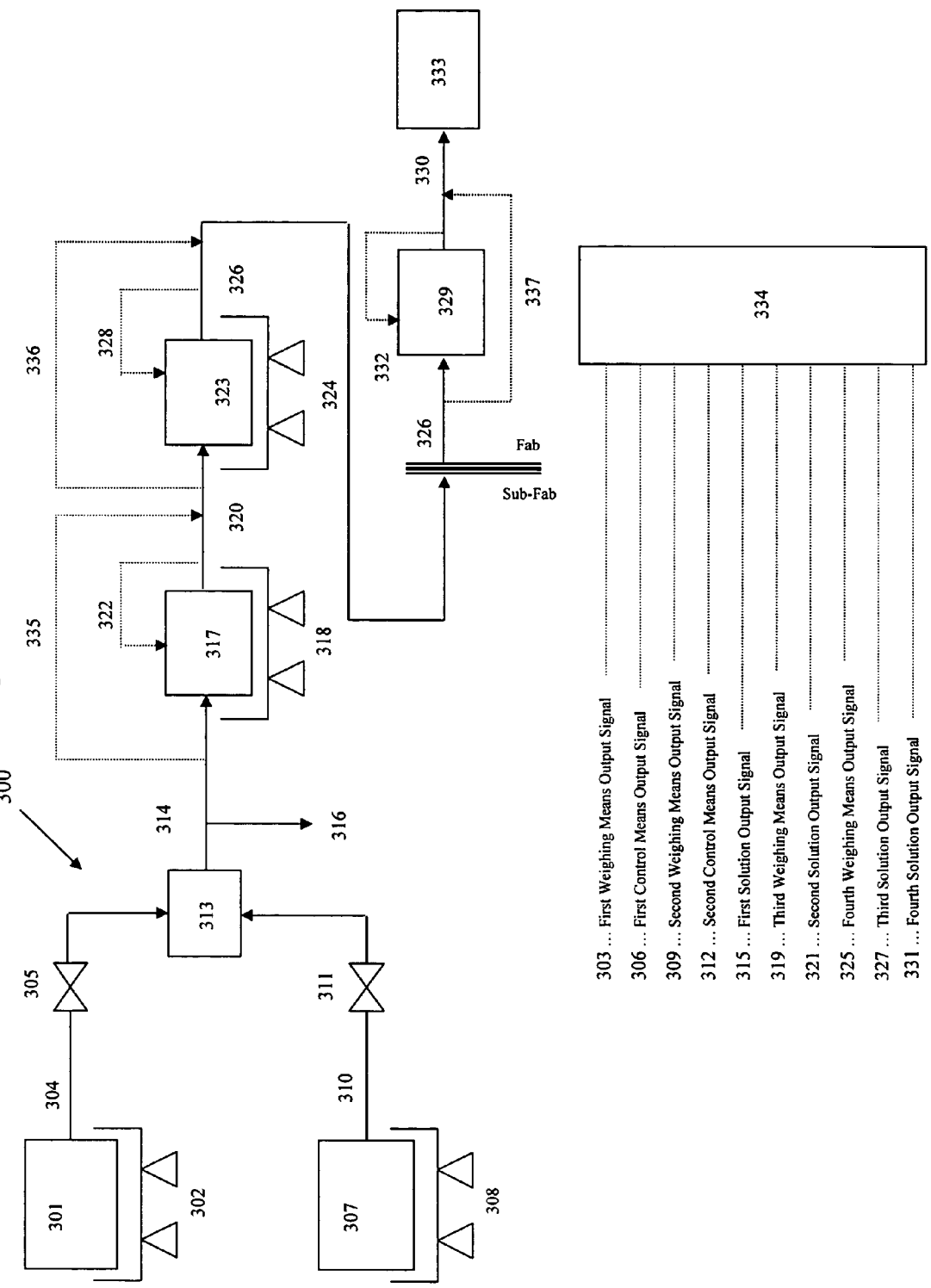
FIG. 3 is a stylized diagram of yet another illustrative embodiment of a blending system in accordance with the present invention.

FIG. 3 is a stylized diagram depicting yet another illustrative embodiment of a blending system 300 according to the present invention. The blending system 300 comprises a first chemical stream 304, a second chemical stream 310, a blender system 313, a first tank system 317, a second tank system 323, a third tank system 329, and an end user 333.

The first chemical stream 304 passes through a first flow control means 305, which generates a first control means output signal 306, which is monitored by the centralized monitoring system 330. The second chemical stream 310 passes through a second control means 311, which generates a second control means output signal 312, which is monitored by the centralized monitoring system 334. The first chemical stream 304 and the second chemical stream 310 are then mixed in the blender system 313, wherein a first solution 314 is formed. A first solution output signal 315 is generated, which is monitored by the centralized monitoring system 334. Based on the nature of first solution output signal 315, the centralized monitoring system 334 will direct either the first flow control means 305 and/or the second flow control means 311 to adjust the flow rate of the first chemical stream 304 and/or the flow rate of the second chemical stream 310, in order to achieve a predetermined formulation for first solution 314. Until the centralized monitoring system 334 receives a first solution output signal 315 that indicates that the predetermined formulation for the first solution 314 is within specification, the output stream from blender system 313 is directed to drain 316.

Once the first solution 314 is within specification, it is no longer directed toward drain 316, but is directed instead to a first tank system 317. As required, a second solution 320 is removed from the first tank system 317 and directed toward the second tank system 323. As this second solution 320 is removed from the first tank system 317, a second solution output signal 321 is monitored by the centralized monitoring system 330. Based on the nature of second solution output signal 321, the centralized monitoring system 330 will direct either the first flow control means 305 and/or the second flow control means 311 to adjust the flow rate of the first chemical stream 304 and/or the flow rate of the second chemical stream 310, which will be directed to the first tank system 317, in order to achieve a predetermined formulation for second solution 320. Until the centralized monitoring system 330 receives a second solution output signal 321 that indicates that the predetermined formulation for the second solution 320 is within specification, the output stream from the first tank system 317 is recycled 322 back to the first tank system 317.

Once the second solution 320 is within specification, it is no longer recycled 322, but is directed instead to second tank system 323. Alternately, first solution 314 may bypass 335 the first tank system 317 and be directed toward second tank system 323. As required, a third solution 326 is removed from the second tank system 323 and directed toward the third tank system 329. As this third solution 326 is removed from the second tank system 323, a third solution output signal 327 is monitored by the centralized monitoring system 334. Based on the nature of third solution output signal 327, the centralized monitoring system 334 will direct either the first flow control means 305 and/or the second flow control means 311 to adjust the flow rate of the first chemical stream 304 and/or the flow rate of the second chemical stream 310, which will be directed to the second tank system 323, in order to achieve a predetermined formulation for third solution 326. Until the centralized monitoring system 334 receives a third solution output signal 327 that indicates that the predetermined formulation for the third solution 326 is within specification, the output stream from the second tank system 323 is recycled 328 to second tank system 323.

Once the third solution 326 is within specification, it is no longer recycled, but is directed instead third tank system 329. Alternately, second solution 320 may bypass 336 the second tank system 323 and be directed toward third tank system 329. As required, a fourth solution 330 is removed from the third tank system 329 and directed toward the end user 333. As this fourth solution 330 is removed from the third tank system 339, a fourth solution output signal 331 is monitored by the centralized monitoring system 334. Based on the nature of fourth solution output signal 331, the centralized monitoring system 334 will direct either the first flow control means 305 and/or the second flow control means 311 to adjust the flowrate of the first chemical stream 304 and/or the flow rate of the second chemical stream 310, which will be directed to the third tank system 329, in order to achieve a predetermined formulation for fourth solution 330. Until the centralized monitoring system 334 receives a fourth solution output signal 331 that indicates that the predetermined formulation for the fourth solution 330 is within specification, the output stream from the third tank system 329 is recycled 332 to third tank system 329. Once the fourth solution 330 is within specification, it is no longer recycled 330, but is directed instead to the end user 333.

Alternately, third solution 330 may bypass 337 the third tank system 329 and be directed toward end user 333.

The blender system 313 comprises a mixing zone in a conduit system. The first chemical stream 304 and the second chemical stream 310 are continuously mixed in this mixing zone and controlled in a real time manner as discussed above, thereby forming a first solution 314 with a predetermined formulation.

Should there arise a situation where more than one adjustment is required from the blender system 313 simultaneously, for example the end user 333 may receive a signal that the fourth solution 330 is not at the predetermined formulation at the same time that it receives signals that the third solution 326 is not at the predetermined formulation, the second solution 320 is not at the predetermined formulation and the first solution 314 is not at the predetermined formulation, then the adjustment to the fourth solution 330 may have a higher priority than the adjustment of the third solution 326 which may in turn have a higher priority than the adjustment of the second solution 320, which may in turn have a higher priority than the adjustment to the first solution 314. One embodiment is that the closer that the maladjustment in solution formulation is to entering the end user 333, the higher the priority that that adjustment has.

The first chemical stream 304 may be obtained from a first component tank 301. This first component tank 301 may have a first weighing means 302, which may generate a first weighing means output signal 303, which is monitored by the centralized monitoring system 334. The second chemical stream 310 may be obtained from a second component tank 307. This second component tank 307 may have a second weighing means 308, which may generate a second weighing means output signal 309, which is monitored by the centralized monitoring system 334.

The first and/or second and/or third tank system 317, 323, 329 comprises at least two tanks each, which are operated either in parallel or in series. These tanks may have a third weighing means 318 and/or a fourth weighing means 324, which may generate a third weighing means output signal 319 and/or a fourth weighing means output signal 325, which is monitored by the centralized monitoring system 334. These tanks may have a recirculation system, which may be used to maintain a homogeneous blend within the tanks. Should a deviation arise in either the second solution 320 and/or the third solution 326 and/or the fourth solution 330 from the predetermined formulations, the time that it will take to adjust the flow rates of either the first chemical stream 304 or the second chemical stream 310 in order to return any of the solutions to the predetermined formulation may be less than about 15 minutes. These tanks may be sized for at least 3 days of constant use by the end user.

The drain cycle discussed above regarding drain 316 may be designed to take less than 8 seconds, before achieving the target predetermined formulation. The drain cycle discussed above regarding drain 316 may be designed so that less than 1 gallon is directed to the drain before achieving the target predetermined formulation.

The blender system 313 may be designed to have a design flow rate of less than about 80 liters per minute. The blender system 313 may be designed to have a design flow rate of less than 1,000,000 gallons per month. The blender system 313 may be designed to have a design flow rate of less than 1,500,000 gallons per month.

The predetermined formulation of either first solution 314 and/or second solution 320 and/or third solution 326 and/or the fourth solution 330 may be maintained by the blender system 313 to within an accuracy of greater than about 0.003 wt %. The predetermined formulation of either first solution 314 and/or second solution 320 and/or the third solution 326 and/or the fourth solution 330 may be maintained by the blender system 313, to within an accuracy of greater than about 0.01 wt %.

The first and/or second solution and/or third solution and/or fourth solution may be monitored for at least one concentration criteria selected from the following group:

a) conductivity;
b) sound velocity;
c) density;
d) viscosity;
e) refractive index;
f) turbidity;
g) auto titration; and
h) a manual analytical verification.

The first and/or second flow control means 305, 311 may control and/or monitor both flow rate and pressure. The first and/or second flow control means 305, 311 may monitor temperature. The combined flow rate, pressure and temperature measurements made by the first and/or second flow control means 305, 311 may be used to index for temperature during concentration calculations for either the first and/or second solutions 314, 320.

The flow rate output signals from the first flow control means 305, the second flow control means 311, and the first solution output signal 315, may be used in conjunction with the first weighing means output signal 303 in order to verify the initial concentration of the contents of the first component tank 301. The flow rate output signals from the first flow control means 305, the second flow control means 311, and the first solution output signal 315, may be used in conjunction with the second weighing means output signal 309 in order to verify the initial concentration of the contents of the second component tank 307.

The change in the first weighing means output signal 303 as a function in time and the change in the second weighing means output signal 309 as a function of time, may be used to verify the flow rate of the first solution 314.

The change in the first weighing means output signal 303 as a function in time, the change in the second weighing means output signal 309 as a function of time, and the change in the third weighing means output signal 319 as a function of time may be used to verify the flow rate of the second solution 320.

The change in the first weighing means output signal 303 as a function in time, the change in the second weighing means output signal 309 as a function of time, the change in the third weighing means output signal 319 as a function of time, and the change in the fourth weighing means output signal 325 as a function of time may be used to verify the flow rate of the third solution 326.

Two or more blending systems 300 may be combined, using a single blender system 313. If two or more blending systems 300 are combined, using a single blender system 313, the the performance of the chemical blending system 300 with the highest volume usage has priority over the system with the next highest volume usage. If two or more blending systems 300 are combined, using a single blender system 313, then prioritization may be controlled manually, in the event of simultaneous demands on the blender system.

Figure 4:
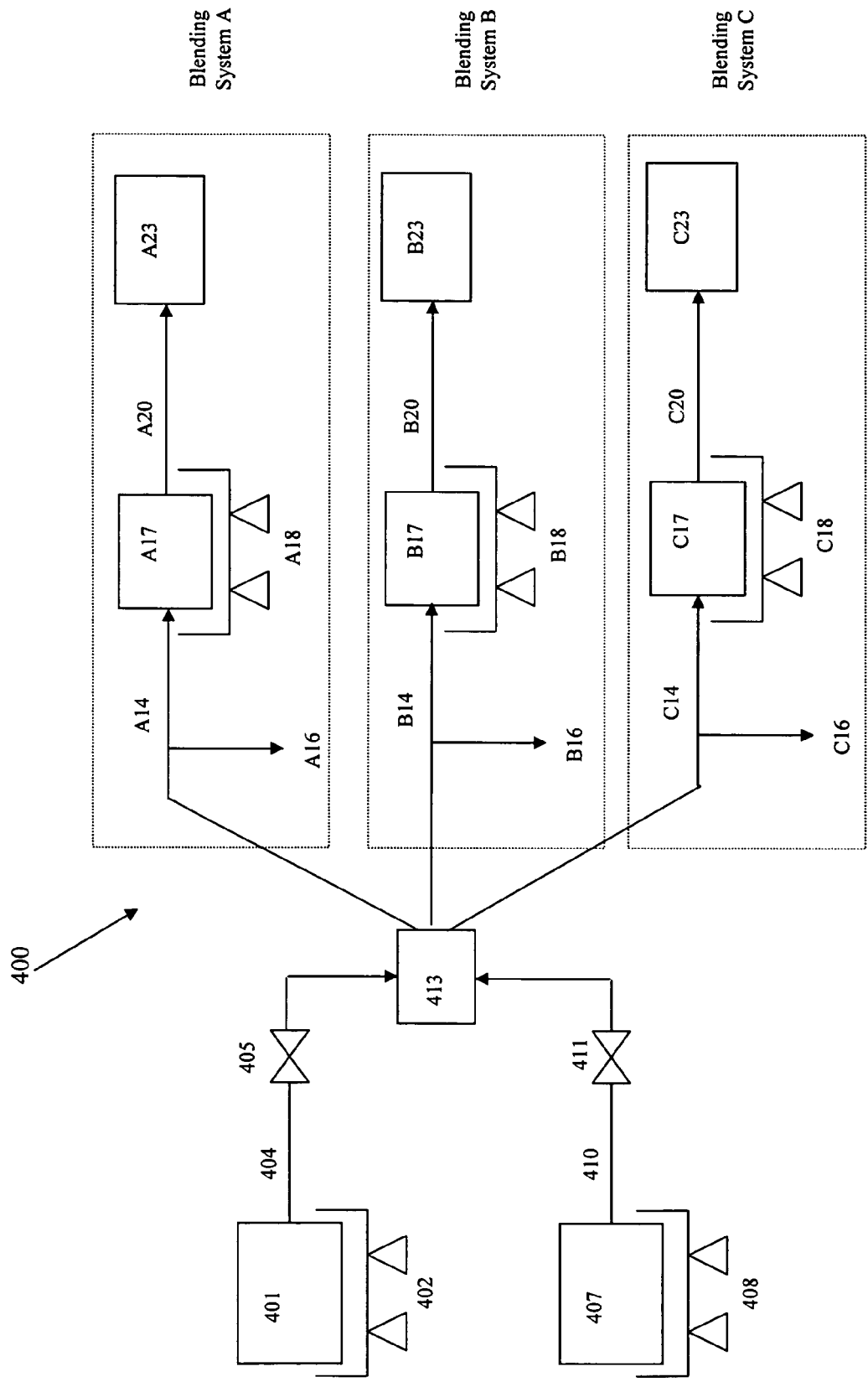
FIG. 4 is a stylized diagram of an illustrative embodiment of a multiple blending system in accordance with the present invention.

FIG. 4 is a stylized diagram depicting an illustrative embodiment of a multiple blending system 400 according to the present invention. The blending system 400 comprises a first chemical stream 404, a second chemical stream 410, a first blender system 413, blending system A, blending system B, and blending system C.

Blending systems A, B, and C are as described in reference to FIG. 1, system 100. Blending system A comprises, at least, a first chemical stream 404, a second chemical stream 410, a blender system 413, a first solution A14, drain A16, a first tank system A17, a second solution A20, and a chemical distribution system A23. Blending system B comprises, at least, a first chemical stream 404, a second chemical stream 410, a blender system 413, a first solution B14, drain B16, a first tank system B17, a second solution B20, and a chemical distribution system B23. Blending system C comprises, at least, a first chemical stream 404, a second chemical stream 410, a blender system 413, a first solution C14, drain C16, a first tank system C17, a second solution C20, and a chemical distribution system C23.

Multiple blending system 400 may represent, as an example, a typical sub-fab installation at a typical semiconductor fabrication facility. In such an installation the first chemical stream may be a developer, a surfactant, de-ionized water, etc. Blending system A may represent a particular blended solution, or a particular concentration of a particular blended solution. First tank A17 may represent a qualification tank or a day tank at such a facility. When the process as described above with reference to FIG. 1 is undertaken with respect to blending system A, the first tank may contain sufficient fluid to supply the tool at the fab for several hours or more. At such at time, the blender system 413 may be purged with de-ionized water, re-calibrated and is available to blend the solution or concentration required by either blending system B or blending system C.

As described above with reverence to FIG. 1, blending system A has numerous points at which the formulation of the solution may be monitored and confirmed. Should corrections become necessary, such corrections may be undertaken as described above with reference to FIG. 1. The centralized monitoring system may monitor and adjust numerous blending streams simultaneously. If two or more blending systems 100 are combined, using a single blender system 100, as defined in system 400, then the performance of the chemical blending system 100 with the highest volume usage has priority over the system with the next highest volume usage. If two or more blending systems 100 are combined, using a single blender system 100, then the prioritization may be controlled manually, in the event of simultaneous demands on the blender system.

It should be noted that the principles of blending system 400 may be applied to any system wherein two or more blending systems 100 are combined using a single blender system 113.

Figure 5:
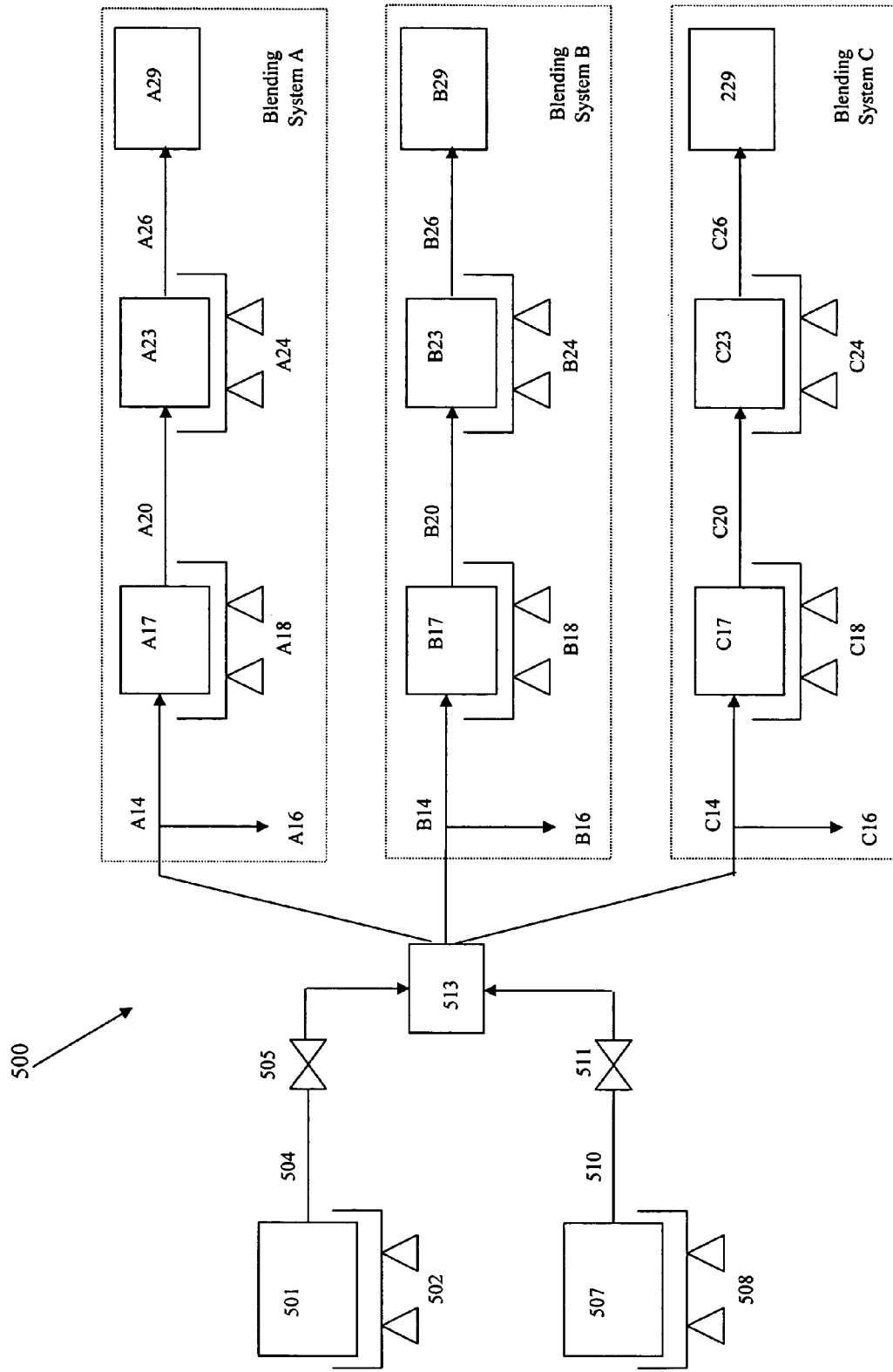
FIG. 5 is a stylized diagram of another illustrative embodiment of a multiple blending system in accordance with the present invention.

FIG. 5 is a stylized diagram depicting another illustrative embodiment of a multiple blending system 500 according to the present invention. The blending system 500 comprises a first chemical stream 504, a second chemical stream 510, a first blender system 513, blending system A, blending system B, and blending system C.

Blending systems A, B, and C are as described in reference to FIG. 2, system 200. Blending system A comprises, at least, a first chemical stream 504, a second chemical stream 510, a blender system 513, a first solution A14, drain A16, a first tank system A17, a second tank system A23, a second solution A20, a third solution A26, and a chemical distribution system A29. Blending system B comprises, at least, a first chemical stream 504, a second chemical stream 510, a blender system 513, a first solution B14, drain B16, a first tank system B17, a second tank system B23, a second solution B20, a third solution B26, and a chemical distribution system B29. Blending system C comprises, at least, a first chemical stream 504, a second chemical stream 510, a blender system 513, a first solution C14, drain C16, a first tank system C17, a second tank system C23, a second solution C20, a third solution C26, and a chemical distribution system C29.

Multiple blending system 500, may represent, as an example, a typical sub-fab installation at a typical semiconductor fabrication facility. In such an installation the first chemical stream may be a developer, a surfactant, de-ionized water, etc. Blending system A may represent a particular blended solution, or a particular concentration of a particular blended solution. First tank A17 or second tank A23 may represent a qualification tank or a day tank at such a facility. When the process as described above with reference to FIG. 2 is undertaken with respect to blending system A, the first tank may contain sufficient fluid to supply the tool at the fab for several hours or more. At such at time, the blender system 513 may be purged with de-ionized water, re-calibrated and is available to blend the solution or concentration required by either blending system B or blending system C. available to blend the solution or concentration required by either blending system B or blending system C.

As described above with reverence to FIG. 2, blending system A has numerous points at which the formulation of the solution may be monitored and confirmed. Should corrections become necessary, such corrections may be undertaken as described above with reference to FIG. 2. The centralized monitoring system may monitor and adjust numerous blending streams simultaneously. If two or more blending systems 200 are combined, using a single blender system 200, as defined in system 500, then the performance of the chemical blending system 200 with the highest volume usage has priority over the system with the next highest volume usage. If two or more blending systems 200 are combined, using a single blender system 200, then the prioritization may be controlled manually, in the event of simultaneous demands on the blender system.

It should be noted that the principles of blending system 500 may be applied to any system wherein two or more blending systems 200 are combined using a single blender system 213.

Figure 6:
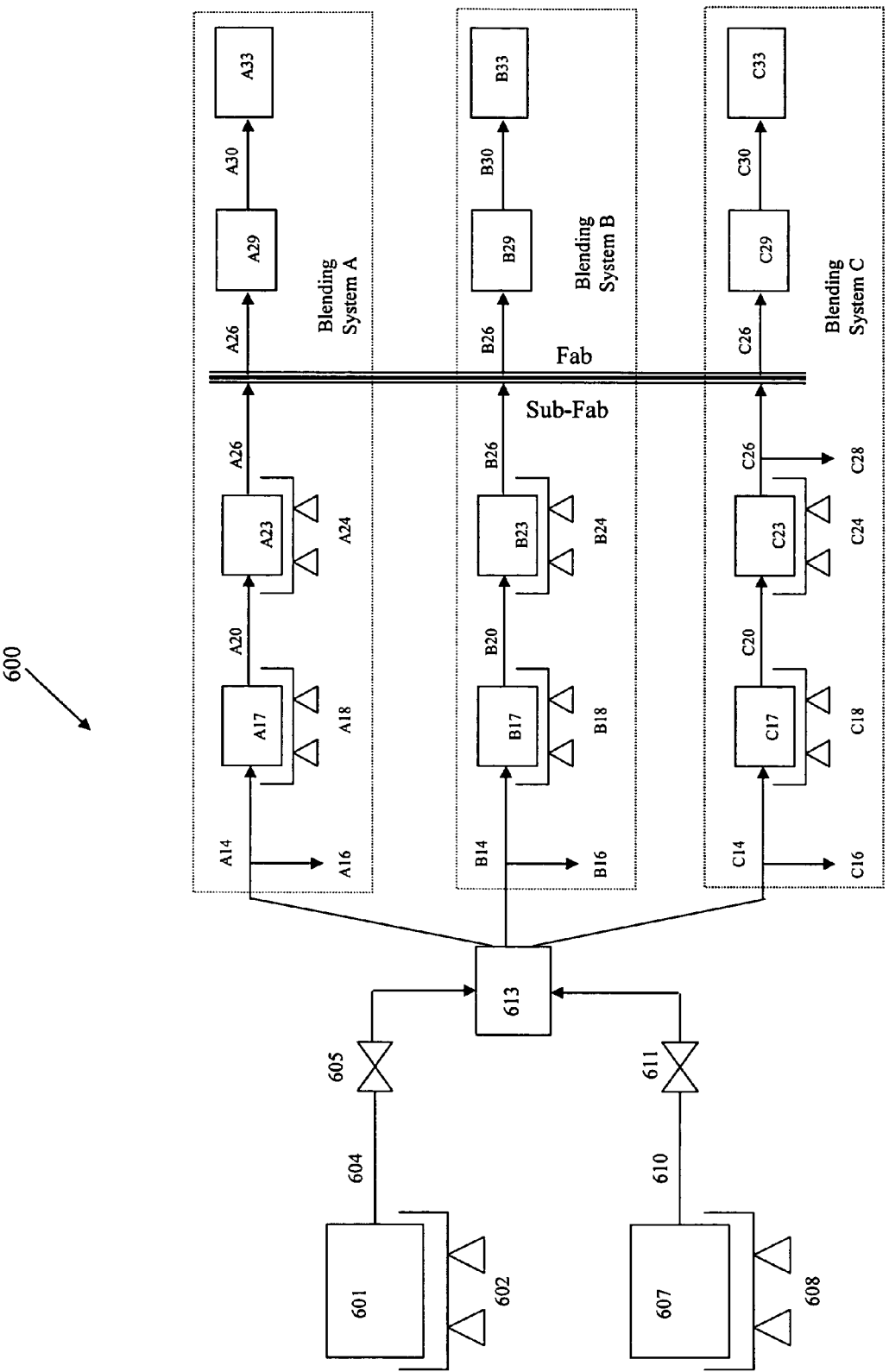
FIG. 6 is a stylized diagram of yet another illustrative embodiment of a multiple blending system in accordance with the present invention.

FIG. 6 is a stylized diagram depicting yet another illustrative embodiment of a multiple blending system 600 according to the present invention. The blending system 600 comprises a first chemical stream 604, a second chemical stream 610, a first blender system 613, blending system A, blending system B, and blending system C.

Blending systems A, B, and C are as described in reference to FIG. 3, system 300. Blending system A comprises, at least, a first chemical stream 604, a second chemical stream 610, a blender system 613, a first solution A14, drain A16, a first tank system A17, a second tank system A23, a third tank system A29, a second solution A20, a third solution A26, a fourth solution A30 and an end user A33. Blending system B comprises, at least, a first chemical stream 604, a second chemical second solution B20, a third solution B26, a fourth solution B30 and an end user B33. Blending system C comprises, at least, a first chemical stream 604, a second chemical stream 610, a blender system 613, a first solution C14, drain C16, a first tank system C17, a second tank system C23, a third tank system C29, a second solution C20, a third solution C26, a fourth solution C30 and an end user C33.

Multiple blending system 600 may represent, as an example, a typical sub-fab installation at a typical semiconductor fabrication facility. In such an installation the first chemical stream may be a developer, a surfactant, de-ionized water, etc. Blending system A may represent a particular blended solution, or a particular concentration of a particular blended solution. First tank A17, second tank A23, or third tank A29 may represent a qualification tank or a day tank at such a facility. When the process as described above with reference to FIG. 3 is undertaken with respect to blending system A, the first tank may contain sufficient fluid to supply the tool at the fab for several hours or more. At such at time, the blender system 613 may be purged with de-ionized water, re-calibrated and is available to blend the solution or concentration required by either blending system B or blending system C.

As described above with reverence to FIG. 3, blending system A has numerous points at which the formulation of the solution may be monitored and confirmed. Should corrections become necessary, such corrections may be undertaken as described above with reference to FIG. 3. The centralized monitoring system may monitor and adjust numerous blending streams simultaneously. If two or more blending systems 300 are combined, using a single blender system 300, as defined in system 600, then the performance of the chemical blending system 300 with the highest volume usage has priority over the system with the next highest volume usage. If two or more blending systems 300 are combined, with the highest volume usage has priority over the system with the next highest volume usage. If two or more blending systems 300 are combined, using a single blender system 300, then the prioritization may be controlled manually, in the event of simultaneous demands on the blender system.

It should be noted that the principles of blending system 600 may be applied to any system wherein two or more blending systems 300 are combined using a single blender system 313.

Illustrative embodiments of the invention are described above. While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

These and other features, aspects, and advantages of the present invention will become better understood with reference to the following description and appended claims.

The invention is not limited to the preferred embodiments described above, but rather defined by the claims set forth below.

What is claimed is:

1. A method of operating a chemical blending system, comprising:
   a) mixing at least a first chemical stream with a second chemical stream in a blender system, said blender system comprising a mixing zone in a conduit system and in a real time controlled manner forming a first solution, wherein the first chemical stream and the second chemical stream are continuously introduced into the mixing zone;

b) monitoring the first solution, wherein the monitoring results in a first solution output signal which is sent to a centralized monitoring system;

c) adjusting a flowrate of the first chemical stream and a flowrate of the second chemical stream to maintain a predetermined formulation of the first solution;

d) introducing the first solution into a first tank system, wherein said first tank system is connected to a chemical distribution system, and wherein the first tank system further comprises at least a first tank and a second tank;

e) delivering a second solution having a predetermined formulation from the first tank system to the chemical distribution system;

f) monitoring the second solution, wherein the monitoring results in a second solution output signal which is sent to the centralized monitoring system; and g) circulating solution out of the first tank system and back to the first tank system while adjusting the flowrate of the first chemical stream and the flowrate of the second chemical stream in order to maintain the predetermined formulation of the second solution.

2. The method of claim 1, wherein the first tank system further comprises a recirculation system configured to perform the circulating.

3. The method of claim 1, wherein the predetermined formulation of the first solution is maintained to within an accuracy of greater than about 0.003 wt %.

4. The method of claim 1, wherein the predetermined formulation of the first solution is maintained to an accuracy of greater than about 0.01 wt %.

5. The method of claim 1, wherein the predetermined formulation of the second solution is maintained to within an accuracy of greater than about 0.003 wt %.

6. The method of claim 1, wherein the predetermined formulation of the second solution is maintained to an accuracy greater than about 0.01 wt %.

7. The method of claim 1, wherein the first solution is monitored for at least one concentration criteria selected from the group consisting of:
a) conductivity;
b) sound velocity;
c) density;
d) viscosity;
e) refractive index;
f) turbidity;
g) auto titration; and
h) a manual analytical verification.

8. The method of claim 1, wherein the second solution is monitored for at least one criteria selected from the group consisting of:
a) conductivity;
b) sound velocity;
c) density;
d) viscosity;
e) refractive index;
f) turbidity;
g) auto titration; and
h) a manual analytical verification.

9. The method of claim 1, wherein the flowrate of the first chemical stream is controlled by a first flowrate control means, wherein the first flowrate control results in a first control means output signal which is sent to the centralized monitoring system and the flowrate of the second chemical stream are controlled by a second flowrate control means, wherein the second flowrate control results in a second control means output signal which is sent to the centralized monitoring system.

10. The method of claim 1, wherein the first chemical stream is obtained from a first component tank, and the second chemical stream is obtained from a second component tank.

11. A method of operating a chemical blending system, comprising:

a) mixing at least a first chemical stream with a second chemical stream in a blender system, said blender system comprising a mixing zone in a conduit system and in a real time controlled manner forming a first solution, wherein the first chemical stream and the second chemical stream are continuously introduced into the mixing zone;

b) monitoring the first solution, wherein the monitoring results in a first solution output signal which is sent to a centralized monitoring system;

c) adjusting a flowrate of the first chemical stream and a flowrate of the second chemical stream to maintain a predetermined formulation of the first solution;

d) introducing the first solution into a first tank system, wherein said first tank system is connected to a second tank system, wherein the first tank system further comprises at least a first tank and a second tank, and wherein the second tank system further comprises at least a third tank and a fourth tank;

e) delivering a second solution having a predetermined formulation from the first tank system to the second tank system;

f) monitoring the second solution, wherein the monitoring results in a second solution output signal which is sent to the centralized monitoring system;

g) circulating solution out of the first tank system and back to the first tank system while adjusting the flowrate of the first chemical stream and the flowrate of the second chemical stream in order to maintain the predetermined formulation of the second solution;

h) delivering a third solution having a predetermined formulation from the second tank system to the chemical delivery system;

i) monitoring the third solution, wherein the monitoring results in a third solution output signal which is sent to the centralized monitoring system; and j) circulating solution out of the second tank system and back to the second tank system while adjusting the flowrate of the first chemical stream and the flowrate of the second chemical stream in order to maintain the predetermined formulation of the third solution.

12. The method of claim 11, wherein the first tank system further comprises a recirculation system configured to perform the circulating.

13. The method of claim 11, wherein the second tank system further comprises a recirculation system.

14. The method of claim 11, wherein the predetermined formulation of the first solution is maintained to within an accuracy of greater than about 0.003 wt %.

15. The method of claim 11, wherein the predetermined formulation of the first solution is maintained to an accuracy of greater than about 0.01 wt %.

16. The method of claim 11, wherein the predetermined formulation of the second solution is maintained to within an accuracy of greater than about 0.003 wt %.

17. The method of claim 11, wherein the predetermined formulation of the second solution is maintained to an accuracy greater than about 0.01 wt %.

18. The method of claim 11, wherein the predetermined formulation of the third solution is maintained to within an accuracy of greater than about 0.003 wt %.

19. The method of claim 11, wherein the predetermined formulation of the third solution is maintained to an accuracy greater than about 0.01 wt %.

20. The method of claim 11, wherein the first solution is monitored for at least one concentration criteria selected from the group consisting of:
a) conductivity;
b) sound velocity;
c) density;
d) viscosity;
e) refractive index;
f) turbidity;
g) auto titration; and
h) a manual analytical verification.

21. The method of claim 11, wherein the second solution is monitored for at least one criteria selected from the group consisting of:
a) conductivity;
b) sound velocity;
c) density;
d) viscosity;
e) refractive index;
f) turbidity;
g) auto titration; and
h) a manual analytical verification.

22. The method of claim 11, wherein the third solution is monitored for at least one criteria selected from the group consisting of:
a) conductivity;
b) sound velocity;
c) density;
d) viscosity;
e) refractive index;
f) turbidity;
g) auto titration; and
h) a manual analytical verification.

23. The method of claim 11, wherein the flowrate of the first chemical stream is controlled by a first flowrate control means, wherein the first flowrate control results in a first control means output signal which is sent to the centralized monitoring system and the flowrate of the second chemical stream are controlled by a second flowrate control means, wherein the second flowrate control results in a second control means output signal which is sent to the centralized monitoring system.

24. The method of claim 11, wherein the first chemical stream is obtained from a first component tank, and the second chemical stream is obtained from a second component tank.

25. A method of operating a chemical blending system, comprising:
a) mixing at least a first chemical stream with a second chemical stream in a blender system, said blender system comprising a mixing zone in a conduit system and in a real time controlled manner forming a first solution, wherein the first chemical stream and the second chemical stream are continuously introduced into the mixing zone;
b) monitoring the first solution, wherein the monitoring results in a first solution output signal which is sent to a centralized monitoring system;
c) adjusting a flowrate of the first chemical stream and the a flowrate of the second chemical stream to maintain a predetermined formulation of the first solution;
d) introducing the first solution into a first tank system, wherein said first tank system is connected to a second tank system, wherein the first tank system further comprises at least a first tank and a second tank, and wherein the second tank system further comprises at least a third tank and a fourth tank;
e) delivering a second solution having a predetermined formulation from the first tank system to the second tank system;
f) monitoring the second solution, wherein the monitoring results in a second solution output signal which is sent to the centralized monitoring system;
g) circulating solution out of the first tank system and back to the first tank system while adjusting the flowrate of the first chemical stream and the flowrate of the second chemical stream in order to maintain the predetermined formulation of the second solution;
h) delivering a third solution having a predetermined formulation from the second tank system to a third tank system, wherein the third tank system further comprises at least a fifth tank and a sixth tank;
i) monitoring the third solution, wherein the monitoring results in a third solution output signal which is sent to the centralized monitoring system;
j) circulating solution out of the second tank system and back to the second tank system while adjusting the flowrate of the first chemical stream and the flowrate of the second chemical stream in order to maintain the predetermined formulation of the third solution;
k) delivering a fourth solution having a predetermined formulation from the third tank system to a final user;
l) monitoring the fourth solution, wherein the monitoring results in a fourth solution output signal which is sent to the centralized monitoring system; and
m) circulating solution out of the third tank system and back to the third tank system while adjusting the flowrate of the first chemical stream and the flowrate of the second chemical stream in order to maintain the predetermined formulation of the fourth solution.

26. The method of claim 25, wherein the first tank system further comprises a recirculation system.

27. The method of claim 25, wherein the second tank system further comprises a recirculation system.

28. The method of claim 25, wherein the third tank system further comprises a recirculation system.

29. The method of claim 25, wherein the predetermined formulation of the first solution is maintained to within an accuracy of greater than about 0.003 wt %.

30. The method of claim 25, wherein the predetermined formulation of the first solution is maintained to an accuracy of greater than about 0.01 wt %.

31. The method of claim 25, wherein the predetermined formulation of the second solution is maintained to within an accuracy of greater than about 0.003 wt %.

32. The method of claim 25, wherein the predetermined formulation of the second solution is maintained to an accuracy greater than about 0.01 wt %.

33. The method of claim 25, wherein the predetermined formulation of the third solution is maintained to within an accuracy of greater than about 0.003 wt %.

34. The method of claim 25, wherein the predetermined formulation of the third solution is maintained to an accuracy greater than about 0.01 wt %.

35. The method of claim 25, wherein the predetermined formulation of the fourth solution is maintained to within an accuracy of greater than about 0.003 wt %.

36. The method of claim 25, wherein the predetermined formulation of the fourth solution is maintained to an accuracy greater than about 0.01 wt %.

37. The method of claim 25, wherein the first solution is monitored for at least one concentration criteria selected from the group consisting of:
   a) conductivity;
   b) sound velocity;
   c) density;
   d) viscosity;
   e) refractive index;
   f) turbidity;
   g) auto titration; and
   h) a manual analytical verification.

38. The method of claim 25, wherein the second solution is monitored for at least one criteria selected from the group consisting of:
   a) conductivity;
   b) sound velocity;
   c) density;
   d) viscosity;
   e) refractive index;
   f) turbidity;
   g) auto titration; and
   h) a manual analytical verification.

39. The method of claim 25, wherein the third solution is monitored for at least one criteria selected from the group consisting of:
   a) conductivity;
   b) sound velocity;
   c) density;
   d) viscosity;
   e) refractive index;
   f) turbidity;
   g) auto titration; and
   h) a manual analytical verification.

40. The method of claim 25, wherein the fourth solution is monitored for at least one criteria selected from the group consisting of:
   a) conductivity;
   b) sound velocity;
   c) density;
   d) viscosity;
   e) refractive index;
   f) turbidity;
   g) auto titration; and
   h) a manual analytical verification.

41. The method of claim 25, wherein the flowrate of the first chemical stream is controlled by a first flowrate control means, wherein the first flowrate control results in a first control means output signal which is sent to the centralized monitoring system and the flowrate of the second chemical stream are controlled by a second flowrate control means, wherein the second flowrate control results in a second control means output signal which is sent to the centralized monitoring system.

42. The method of claim 25, wherein the first chemical stream is obtained from a first component tank, and the second chemical stream is obtained from a second component tank.

43. A method of operating a chemical blending system, comprising:
   a) mixing at least a first chemical stream with a second chemical stream in a mixing zone of a blender system to form a first solution, wherein the first chemical stream and the second chemical stream are continuously introduced into the mixing zone;
   b) monitoring the first solution, wherein the monitoring results in a first solution output signal which is sent to a centralized monitoring system;
   c) on the basis of the first solution output signal, adjusting a flowrate of the first chemical stream and a flowrate of the second chemical stream to maintain a predetermined formulation of the first solution;
   d) delivering the first solution from the blender system into a first tank system, wherein the first tank system comprises at least a first tank and a second tank;
   e) delivering a second solution from the first tank system;
   f) monitoring the second solution, wherein the monitoring results in a second solution output signal which is sent to the centralized monitoring system;
   g) circulating solution out of the first tank system and back to the first tank system while adjusting the flowrate of the first chemical stream and the flowrate of the second chemical stream in order to maintain a predetermined formulation of the second solution; the adjusting being done on the basis of the second solution output signal;
   h) delivering the first solution from the blender system into a second tank system, wherein the second tank system comprises at least a third tank and a fourth tank;
   i) delivering a third solution from the second tank system;
   j) monitoring the third solution, wherein the monitoring results in a third solution output signal which is sent to the centralized monitoring system; and
   k) circulating solution out of the second tank system and back to the second tank system while adjusting the flowrate of the first chemical stream and the flowrate of the second chemical stream in order to maintain a predetermined formulation of the third solution; the adjusting being done on the basis of the third solution output signal.

44. The method of claim 43, wherein the first tank system and the second tank system are in fluid communication with one or more semiconductor processing tools.

45. The method of claim 43, wherein adjusting the flowrate of the first chemical stream and the flowrate of the second chemical stream in order to maintain the respective predetermined formulations of the second and third solutions is given priority over adjusting the flowrate of the first chemical stream and the flowrate of the second chemical stream in order to maintain the predetermined formulation of the first solution.

46. The method of claim 43, further comprising controlling delivery priority of the first solution from the blender system to the first and second tank systems according to volume usage of solution from the respective tank systems.

* * * * *

UNITED STATES PATENT AND TRADEMARK OFFICE
CERTIFICATE OF CORRECTION

PATENT NO. : 7,344,297 B2 Page 1 of 1
APPLICATION NO. : 11/107494
DATED : March 18, 2008
INVENTOR(S) : Urquhart It is certified that error appears in the above-identified patent and that said Letters Patent is hereby corrected as shown below:

In Column 20, line 1, remove the word "the".

Signed and Sealed this

Twenty-seventh Day of April, 2010

David J. Kappos
*Director of the United States Patent and Trademark Office*